United States Patent
Sletten et al.

(10) Patent No.: US 11,275,168 B2
(45) Date of Patent: Mar. 15, 2022

(54) MORPHOLOGICAL COMPONENTS ANALYSIS FOR MARITIME TARGET DETECTION

(71) Applicant: The Government of the United States of America, as represented by the Secretary of the Navy, Arlington, VA (US)

(72) Inventors: Mark A. Sletten, Takoma Park, MD (US); Hatim Alqadah, Aldie, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 334 days.

(21) Appl. No.: 16/235,536

(22) Filed: Dec. 28, 2018

(65) Prior Publication Data

US 2019/0302251 A1    Oct. 3, 2019

Related U.S. Application Data

(60) Provisional application No. 62/611,123, filed on Dec. 28, 2017.

(51) Int. Cl.
*G01S 13/44* (2006.01)
*G01S 7/295* (2006.01)
(Continued)

(52) U.S. Cl.
CPC .......... *G01S 13/449* (2013.01); *G01S 7/2955* (2013.01); *G01S 7/41* (2013.01); *G01S 7/414* (2013.01); *G01S 13/06* (2013.01); *G01S 13/5244* (2013.01); *G01S 13/5248* (2013.01); *G06F 17/11* (2013.01)

(58) Field of Classification Search
CPC .... G01S 13/449; G01S 13/5244; G01S 7/414; G01S 13/06; G01S 13/5248; G01S 7/41
See application file for complete search history.

(56) References Cited

U.S. PATENT DOCUMENTS

2015/0104064 A1*   4/2015  Guissin ............... G06T 7/32
382/103

FOREIGN PATENT DOCUMENTS

CN        102914768 B   *  9/2014
CN        106093890 A   * 11/2016

OTHER PUBLICATIONS

Bobin et al., "Morphological Component Analysis: An Adaptive Thresholding Strategy", IEEE 2007 (Year: 2007).*

(Continued)

*Primary Examiner* — Thomas M Hammond, III
(74) *Attorney, Agent, or Firm* — US Naval Research Laboratory; William P. Ladd (57) ABSTRACT

Systems and methods are provided for morphological components analysis (MCA) techniques for efficient maritime target detection. Embodiments of the present disclosure provide systems, methods, and devices for determining the free parameter λ for MCA analysis. Embodiments of the present disclosure using MCA utilize effective pre-processing step(s) that separate target signals from clutter, thereby improving the overall performance of subsequent target detection processing. Systems and methods in accordance with embodiments of the present disclosure can optimize the value of the parameter λ, significantly affecting MCA performance.

20 Claims, 8 Drawing Sheets

(51) Int. Cl.
   *G01S 13/524*   (2006.01)
   *G01S 13/06*    (2006.01)
   *G01S 7/41*     (2006.01)
   *G06F 17/11*    (2006.01)

(56) References Cited

OTHER PUBLICATIONS

Starck et al., "Morphological Component Analysis", Proceding of the SPIE—Aug. 2005 (Year: 2005).*
Yang et al., "Seislet-based Morphological Component Analysis Using Scale-dependent Exponential Shrinkage", Journal of Applied Geophysics—2015 (Year: 2015).*
Dubois et al., "Morphological Component Analysis for Decomposing Dynamic Textures", Springer 2011 (Year: 2011).*

* cited by examiner

MORPHOLOGICAL COMPONENTS ANALYSIS FOR MARITIME TARGET DETECTION

CROSS REFERENCE TO RELATED APPLICATIONS

This application claims the benefit of U.S. Provisional Patent Application No. 62/611,123, filed on Dec. 28, 2017, which is incorporated by reference herein in its entirety.

FIELD OF THE DISCLOSURE

This disclosure relates to radar applications, including signal processing for radar target detection.

BACKGROUND

Radar systems use radio waves to detect objects. For example, a transmitter of a radar system can send radio waves to an object, and the reflected waves return to the receiver of the radar system. Based on the reflected wave, the radar system can determine positional information about the object (e.g., range, angle, velocity, etc.)

Radar-based detection of vessels and other floating targets on the sea surface is an enduring challenge for the Navy as well as for civilian agencies involved in coastal management. The transient nature of the backscatter generated by the dynamic sea surface itself makes detection of targets floating on it difficult, and despite many decades of research, the search for new approaches to this challenge is ongoing. For example a signal (e.g., the backscatter produced by floating surface targets) can be difficult to detect due to clutter (e.g., undesired backscatter produced by the sea surface itself) on the sea surface, interfering with signal detection.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods using morphological components analysis (MCA) techniques for efficient maritime target detection. For example, embodiments of the present disclosure use MCA to separate target signals from clutter as a preprocessing step, to improve the signal-to-clutter ratio, before further analysis with a detection algorithm and/or system. One difficulty with using MCA techniques for target detection is a selection criterion for the free parameter $\lambda$. For example, $\lambda$ can range from 0 to 1, yet MCA performance can exhibit a sharp peak in the vicinity of a particular value. Embodiments of the present disclosure provide systems, methods, and devices for determining the free parameter $\lambda$. Using embodiments of the present disclosure, MCA can be effectively used for radar-based detection of targets floating on the sea surface.

Embodiments of the present disclosure using MCA utilize effective pre-processing step(s) that separate target signals from clutter, thereby improving the overall performance of subsequent target detection processing. Systems and methods in accordance with embodiments of the present disclosure can optimize the value of the parameter λ, significantly affecting MCA performance.

2. Morphological Components Analysis

In MCA, both the signal of interest and the clutter in which it is embedded are usually assumed to be sparse, in that both can be represented by a limited number of basis functions, or "atoms," within a larger group, referred to as a "dictionary." In an embodiment, effective application of MCA also requires minimal coherence between the dictionaries that represent the signal and the clutter. In an embodiment, the two dictionaries are the short-time Fourier Transform (STFT) with a relatively wide analysis window, which we refer to as the "narrowband" or "target" channel, and the STFT with a relatively short analysis window, referred to as the "wideband" or "clutter" channel. In both cases, the atoms in these dictionaries can be formed by sliding the analysis window through the data to be analyzed.

In an embodiment, the selection of these dictionaries follows from the observed characteristics of radar backscatter produced in maritime environments. Hard targets on the sea surface, such as vessels, produce radar signals with a relatively narrow Doppler bandwidth, owing to the fact that these echoes are produced by a relatively limited number of long-lived scattering centers (the specular surfaces and re-entrant corners of the vessel's structure) moving at nearly constant velocities. Thus, in an embodiment, these signals will be sparse in under the narrowband STFT, since only a few Doppler frequencies are required to represent them. In contrast, the ocean surface itself produces radar backscatter with a relatively wide Doppler bandwidth, since it is comprised of many short-lived, scattering centers (surface wave facets and other transient hydrodynamic features) moving at different speeds. Thus, in an embodiment, this clutter will be sparse under the wideband STFT transform, since these events are highly localized in time.

In an embodiment, the central operation of MCA is minimization of the number of atoms needed to represent the input data (signal plus clutter), an action that separates the signal and the clutter into their respective dictionaries. In an embodiment, to perform this minimization, we first express the input data x as the sum of two components, $x_1$ and $x_2$, where $x_1$ is the wideband clutter component and $x_2$ is the narrowband component produced by the target:

$$x = x_1 + x_2 \quad (1)$$

In Equation (1), x, $x_1$, and $x_2$ are vectors in which the elements are complex samples of the signals at discrete instances of time at a given range bin. In an embodiment, our objective is to estimate $x_1$ and $x_2$. To do this, we can assume that $x_1$ is sparse under the dictionary (aka STFT) $\Phi_1$, and that likewise, $x_2$ is sparse under the transform $\Phi_2$:

$$x_1 \cong \Phi_1^H w_1 \, x_2 \cong \Phi_2^H w_2 \quad (2)$$

In Equation (2), $w_1$ and $w_2$ are the sparse coefficients of those transforms, and the H superscript indicates Hermitian conjugate. The MCA minimization can then be expressed as:

$$\operatorname*{argmin}_{w_1, w_2} \lambda \|w_1\|_1 + (1-\lambda)\|w_2\|_1 \quad (3)$$

subject to:

$$x = \Phi_1^H w_1 + \Phi_2^H w_2 \quad (4)$$

In Equation (3), The symbol $\|\cdot\|$ indicates the L−1 norm computed as the sum of the absolute values of the vector elements, and argmin refers to the values of $w_1$ and $w_2$ that produce the minimum. In an embodiment, the minimization expression can be solved using the Split Augmented Lagrangian Shrinkage Algorithm (SALSA).

In an embodiment, the free parameter λ, known as the "regularization parameter," is of particular interest. As illustrated later, in an embodiment, the performance of MCA can be quite sensitive to the value of λ, yet no systematic method for its selection has been previously reported. In the next section, a heuristic selection method is described, and its effectiveness is illustrated.

3. Determination of the Regularization Parameter λ

Minimization problems involving the L−1 norm, such as Equation (3), exhibit a "stair-step" behavior with respect to λ, due to the underlying soft-threshold operator. Indeed, when λ=0, it can be shown that every element in $x_2$ is zero. As λ increases, energy transfers from $x_1$ to $x_2$ in a stair-like manner due to the successive inclusion of more sparse terms. In an embodiment, the value of λ corresponding to the dominant step is optimal with respect to MCA's ability to separate the target and clutter contributions. In an embodiment, we refer to that value as λ*. In an embodiment, we compute λ* as the point of maximum curvature, with respect to λ, in the ratio of the target to clutter channel norms, β:

$$\lambda^* = \operatorname*{argmax}_{\lambda} \frac{|\beta''|}{(1+\beta'^2)^{3/2}} \text{ with } \beta = \frac{\|x_2\|_1}{\|x_1\|_1} \quad (5)$$

In Equation (5), and argmin refers to the values of $x_1$ and $x_2$ that produce the maximum (e.g., maximum curvature). In Equation (5), (•)' and (•)" indicate first and second derivatives, respectively. In an embodiment, this is a characteristic of the clutter only and is computed from target-free data.

4. Exemplary Data Sets

Below, we demonstrate, using two datasets, that, in an embodiment, MCA performance is indeed "optimal" when λ=λ*. The first data set was generated using a high-fidelity simulation of the radar backscatter produced by a sphere floating on a dynamic sea surface, while the second data set is publically accessible experimental data provided by the South African Council for Industrial and Scientific Research (CSIR).

4.1. Exemplary Simulated Floating Sphere Example

The two-dimensional (range, height) simulation used to generate the floating sphere data set consists of two basic components. The first is a hydrodynamic representation of a dynamic sea surface that includes the sphere and a simple model for its motion. An initial realization of the sea surface is first generated through a standard model for the ocean wave spectrum, then allowed to evolve in time and space according to the linear water wave dispersion relation, subject to a hydrodynamic nonlinearity encoded by the Creamer transformation. For the present work, floating, semi-submerged spheres were added. The motion of each sphere can be determined by the sub-surface orbital wave currents at the sphere's (user selected) center. These orbital currents can be assumed to decay exponentially with depth, and for simplicity, they can be computed assuming that the spheres are absent, i.e., the spheres move with the waves but do not perturb them.

Figure 1:
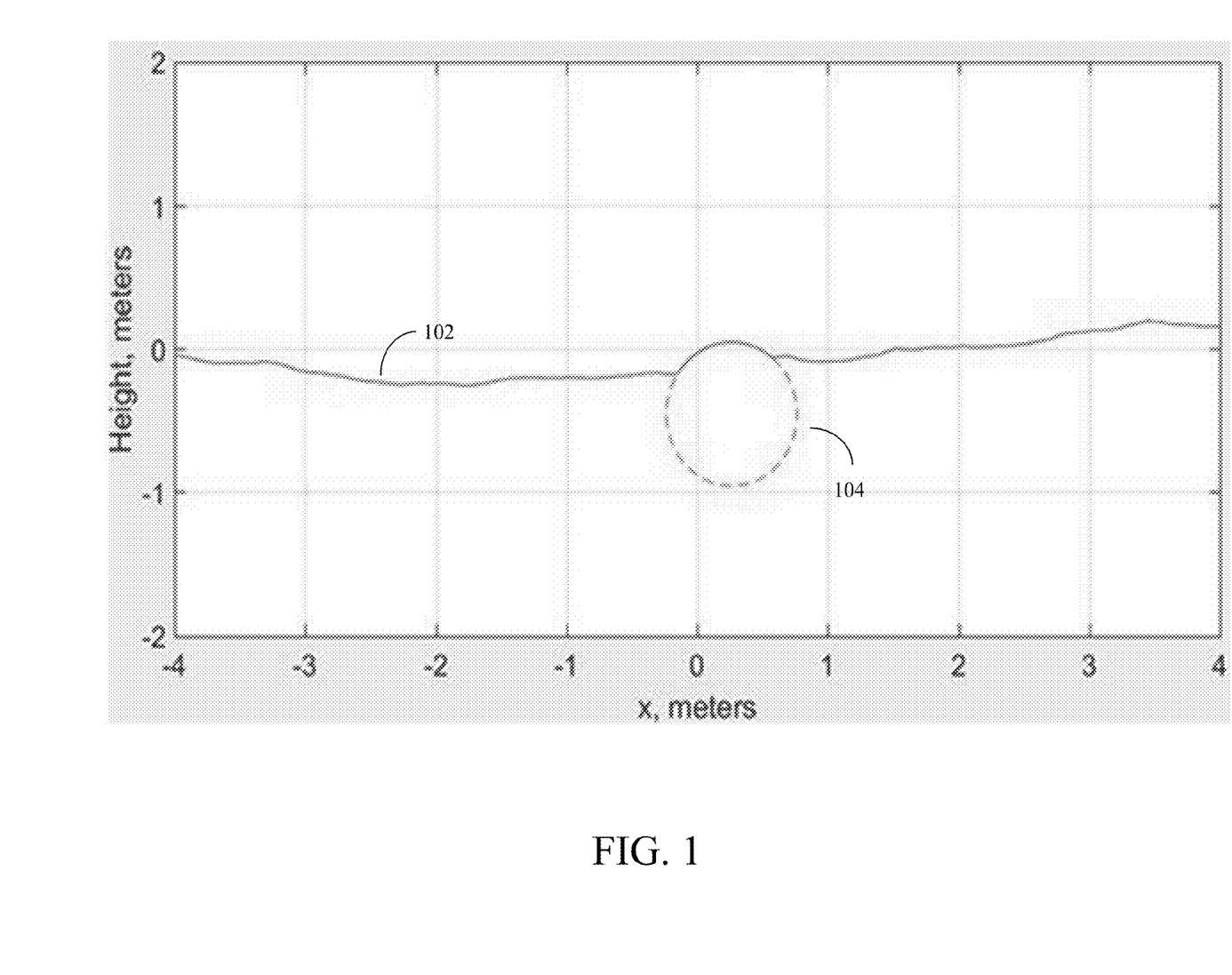
FIG. 1 is a diagram showing an exemplary "snapshot" of a broached sphere and the sea surface around it at a particular instance in time in accordance with an embodiment of the present disclosure.

The second component is a direct numerical simulation (DNS) of the electromagnetic scattering generated by the surface. This DNS produces radar backscatter over a wide range swath (100's of meters) at any desired incidence angle and degree of spatial resolution (subject to available computational resources). Data are analyzed for an incidence angle of 60 degrees, a radar center frequency of 10 GHz, and range resolutions of 3.0 and 0.34 m. All data correspond to an up-wind look direction with simulated wind speeds of 5, 7, and 10 m/s. FIG. 1 is a diagram showing an exemplary "snapshot" of a broached sphere and the sea surface around it at a particular instance in time in accordance with an embodiment of the present disclosure. The DNS computes the backscatter from the surface outlined by a solid line 102, while a dashed line 104 indicates the position of the submerged portion of the sphere.

Figure 2:
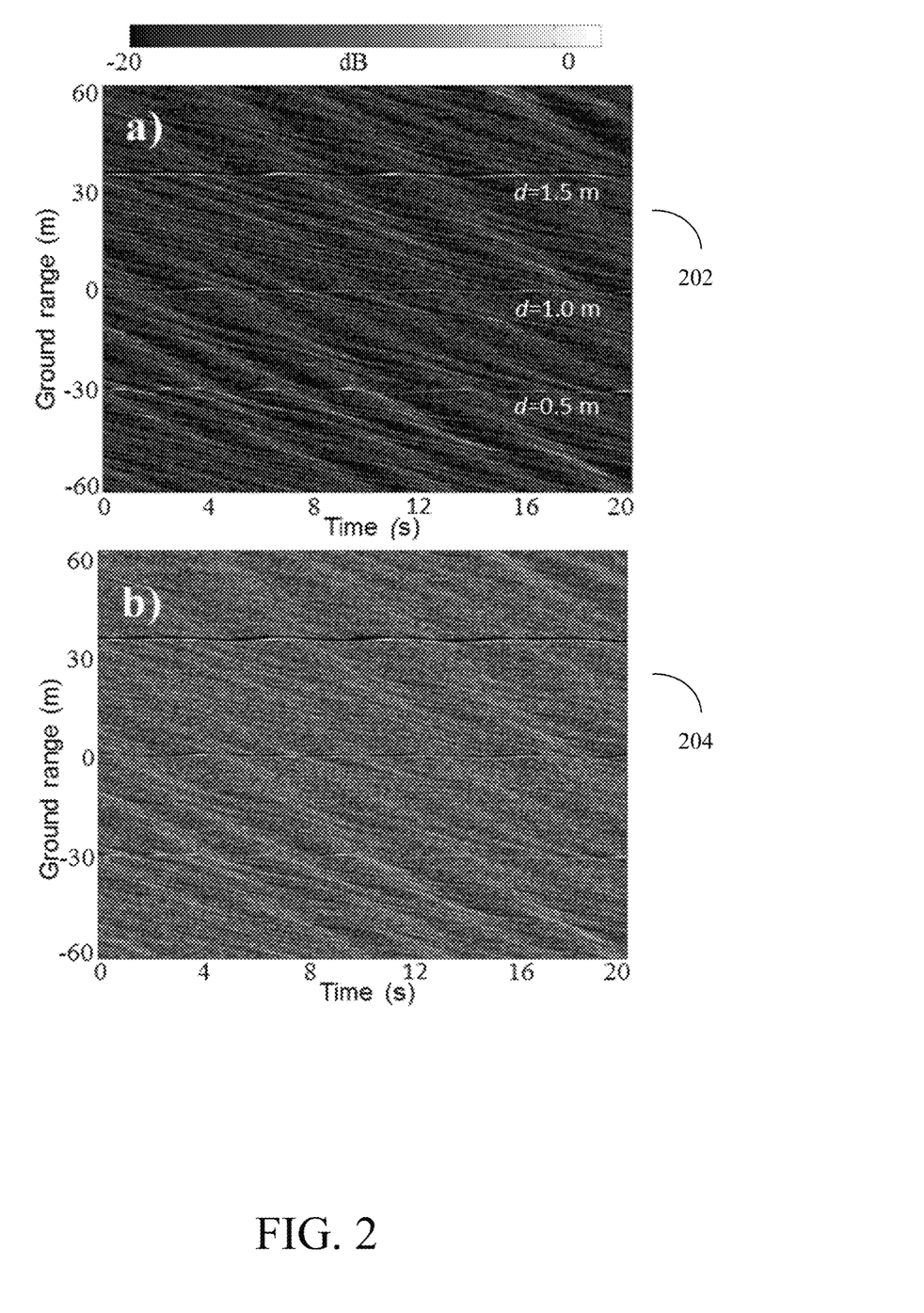
FIG. 2 is a diagram illustrating a range-time plot of backscatter magnitude for both vertical and horizontal polarization, a wind speed of 7 m/s, and range resolution of 0.34 m in accordance with an embodiment of the present disclosure.

FIG. 2 is a diagram illustrating a range-time plot of the backscatter magnitude for both vertical (b) 204 and horizontal (a) 202 polarization, a wind speed of 7 m/s, and range resolution of 0.34 m in accordance with an embodiment of the present disclosure. Waves propagate from top to bottom (towards the radar), and the backscatter from three floating spheres of diameters d=1.5, 1.0, and 0.5 m can be seen as the horizontal, intermittent signals located at ranges of 35, 0, and −30 m, respectively. All spheres are submerged such that at the beginning of the simulation, their centers are d/3 below the surface. As the orbital current at the sphere's center is the sum of the currents generated by a spectrum of waves propagating at different speeds, the amount of broaching varies dynamically, as evidenced by the intermittent character of the sphere backscatter.

4.2. Exemplary Vessels at Sea Example

Embodiments of the present disclosure using $\lambda^*$ were further tested using publically available data from the CSIR DPSS Sea Clutter Library. The data consist of measured backscatter produced by both a shipping vessel and a rigid inflatable boat (RIB) under wind speeds of approximately 16 kts and significant wave height of 2-3 m. The radar range resolution is 15 m, the polarization is vertical, and the grazing angle is approximately 1 degree. For the shipping vessel collection, the radar center frequency was set to 6.9 GHz, while for the collection against the RIB, the center frequency was 9 GHz.

Figure 3:
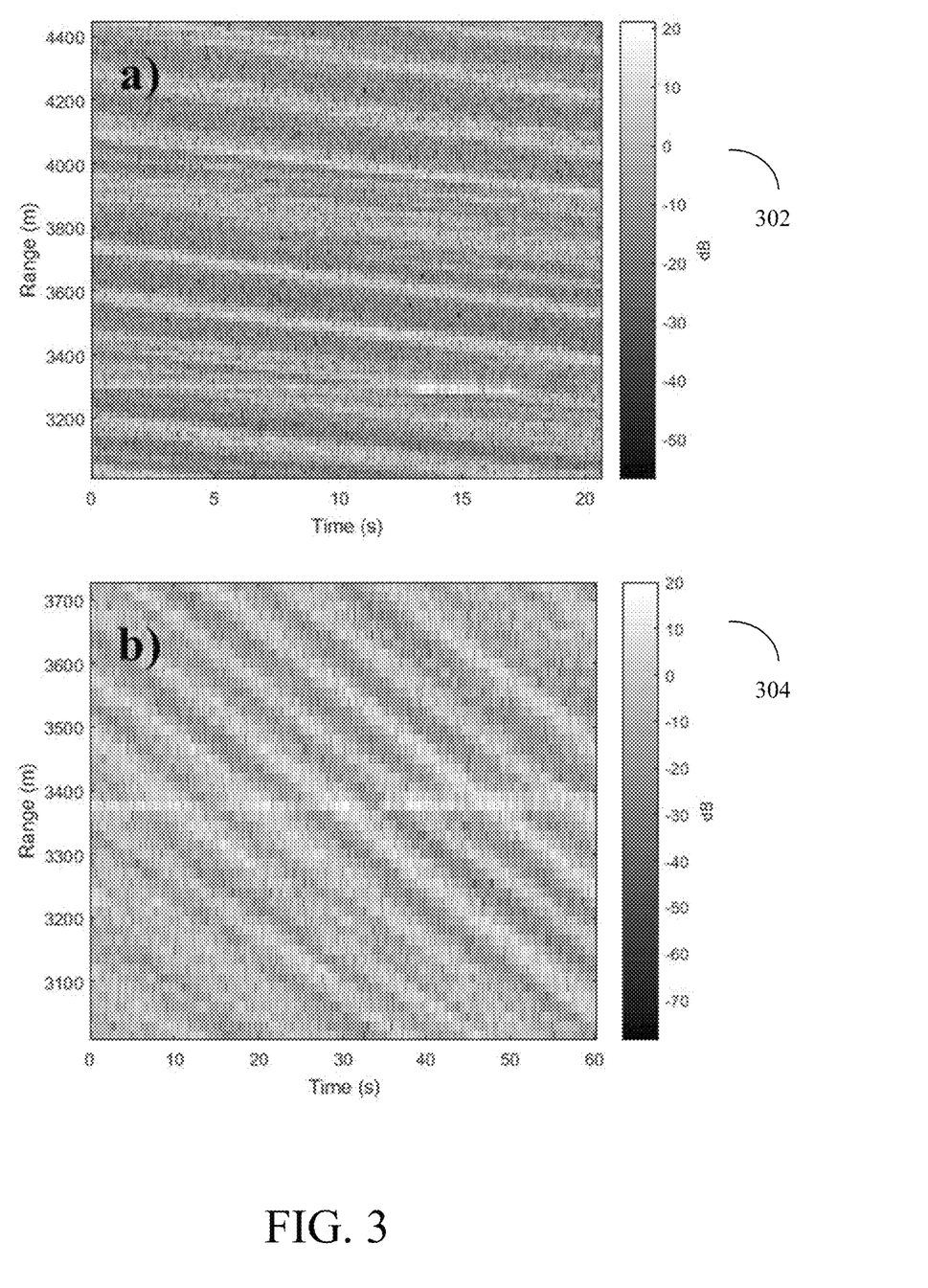
FIG. 3 is a diagram illustrating range-time backscatter plots for both a rigid inflatable boat (RIB) and a shipping vessel in accordance with an embodiment of the present disclosure.

FIG. 3 is a diagram illustrating range-time backscatter plots for both the RIB (a) 302 and the shipping vessel (b) 304 in accordance with an embodiment of the present disclosure. The signal produced by the shipping vessel backscatter can be seen near a range of 3400 m in (b) 304, while the RIB signal is fainter and more intermittent near 3300 m in (a) 302.

4.3. Exemplary Calculation of $\lambda$

Figure 4:
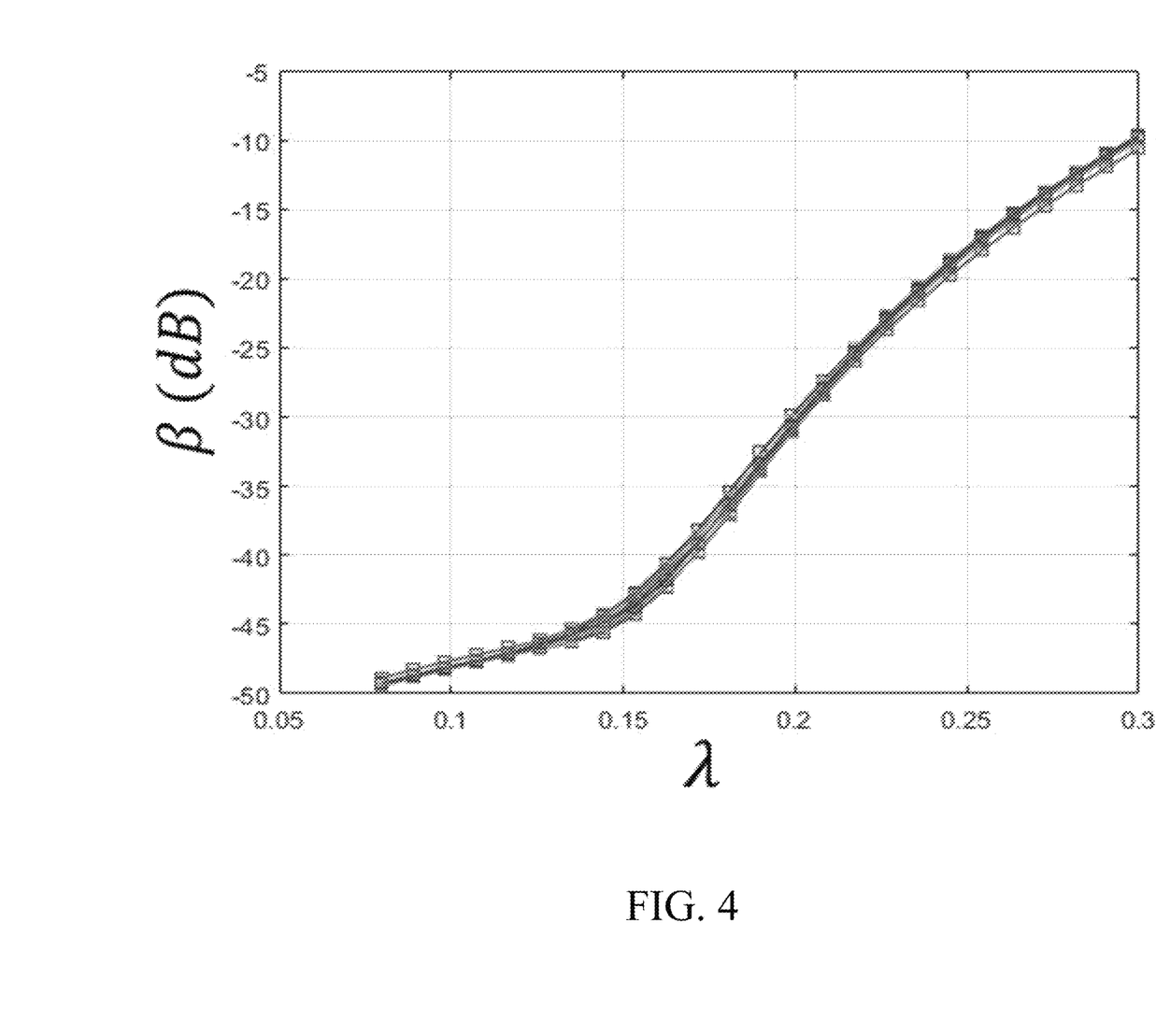
FIG. 4 is a diagram illustrating an exemplary plot of the clutter-to-target leakage ratio (β in accordance with an embodiment of the present disclosure.

FIG. 4 is a diagram illustrating an exemplary plot of the clutter-to-target leakage ratio $\beta$ in accordance with an embodiment of the present disclosure. FIG. 4 was generated using the data in FIG. 2 (b) 204 before insertion of the floating spheres. The individual curves in the figure were computed by analyzing 10 non-overlapping segments of data, each 2 seconds in duration. For each 2-s segment, the L−1 norms in $\beta$ were computed by summing over all clutter range bins as well as over all time samples at each bin. While the point of maximum curvature in each curve can be seen clearly, there is some variation from curve to curve in the value of $\lambda^*$. In this particular case, the mean value is 0.15 with a standard deviation of 0.01. For the other floating sphere cases presented here, $\lambda^*$ ranges from 0.14 to 0.19. The values for the clutter surrounding the RIB and shipping vessel are 0.23 and 0.21, respectively. A window width of 16 ms was used for the clutter STFT, while a 1 s window was used for the target channel.

4.4. Exemplary Detection Performance vs. $\lambda^*$

In an embodiment, to test $\lambda^*$, MCA was used to preprocess the floating sphere and vessel backscatter data before detection. MCA decomposition was first performed on 2-second, non-overlapping segments of data using a particular value of $\lambda$. Then, the resulting signal channels (one for each 2-second segment) were subjected to a detector using a given value of the detection threshold, and all the false alarms and all the detections were combined. This detection step was then repeated using a wide range of threshold values to allow formation of a receiver operating characteristic.

Figure 5A:
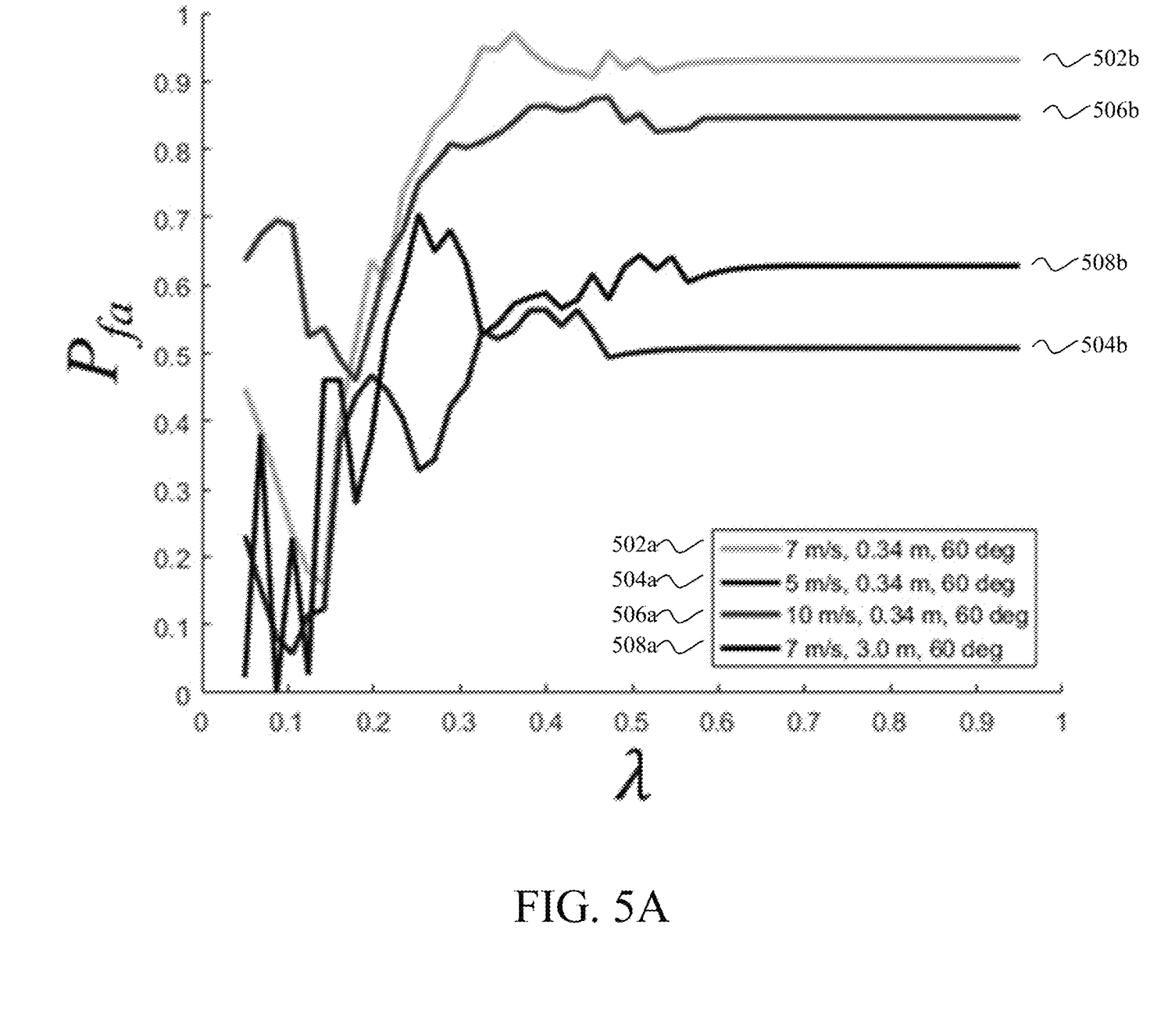
FIG. 5A is a diagram plotting results for the smallest floating sphere using vertical polarization, wind speeds of 5, 7, and 10 m/s, and resolutions of 0.34 and 3.0 m in accordance with an embodiment of the present disclosure.
Figure 5B:
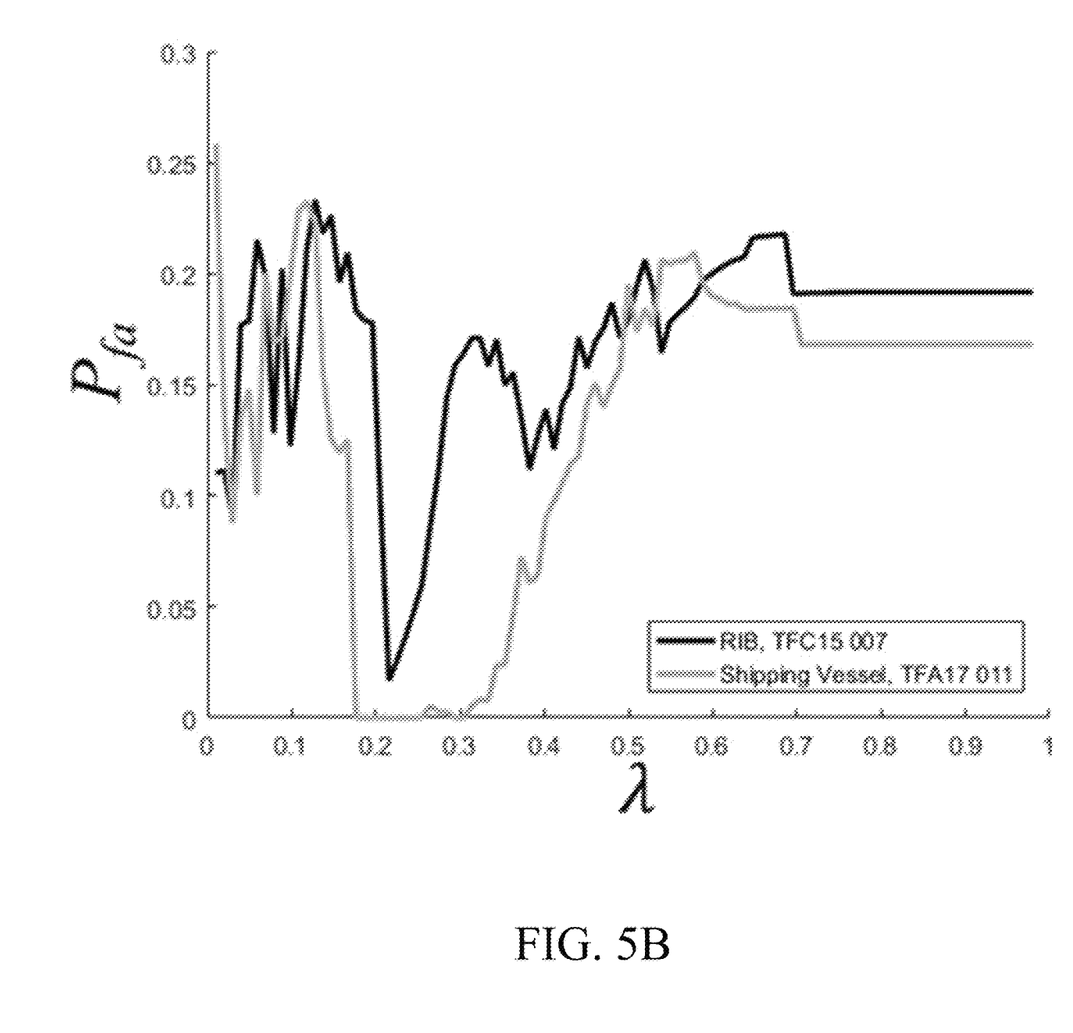
FIG. 5B is a diagram presenting the results for vessel data in accordance with an embodiment of the present disclosure.

By repeating this entire procedure over a range of $\lambda$ values, the false alarm rate for a particular probability of detection was determined as a function of $\lambda$. FIG. 5A is a diagram plotting results for the smallest floating sphere using vertical polarization, wind speeds of 5, 7, and 10 m/s, and resolutions of 0.34 and 3.0 m in accordance with an embodiment of the present disclosure. In FIG. 5A, plot 502b corresponds to legend element 502a, plot 504b corresponds to legend element 504a, plot 506b corresponds to legend element 506a, and plot 508b corresponds to legend element 508a. FIG. 5B is a diagram presenting the results for the vessel data in accordance with an embodiment of the present disclosure.

The plots show that detector performance is indeed enhanced near $\lambda^*$, as shown by the minima in the floating sphere curves for $0.1 < \lambda < 0.2$ and in the vessel data for $0.2 < \lambda < 0.3$. Due to the relatively small number of possible detections (e.g. only 10 for each sphere using the 20-second simulations and 2-second analysis segments), the curves are somewhat noisy. But minima in the curves near their respective values of are still apparent. This result is a confirmation that the use of does indeed enhance the performance of MCA.

5. Exemplary Methods

Figure 6:
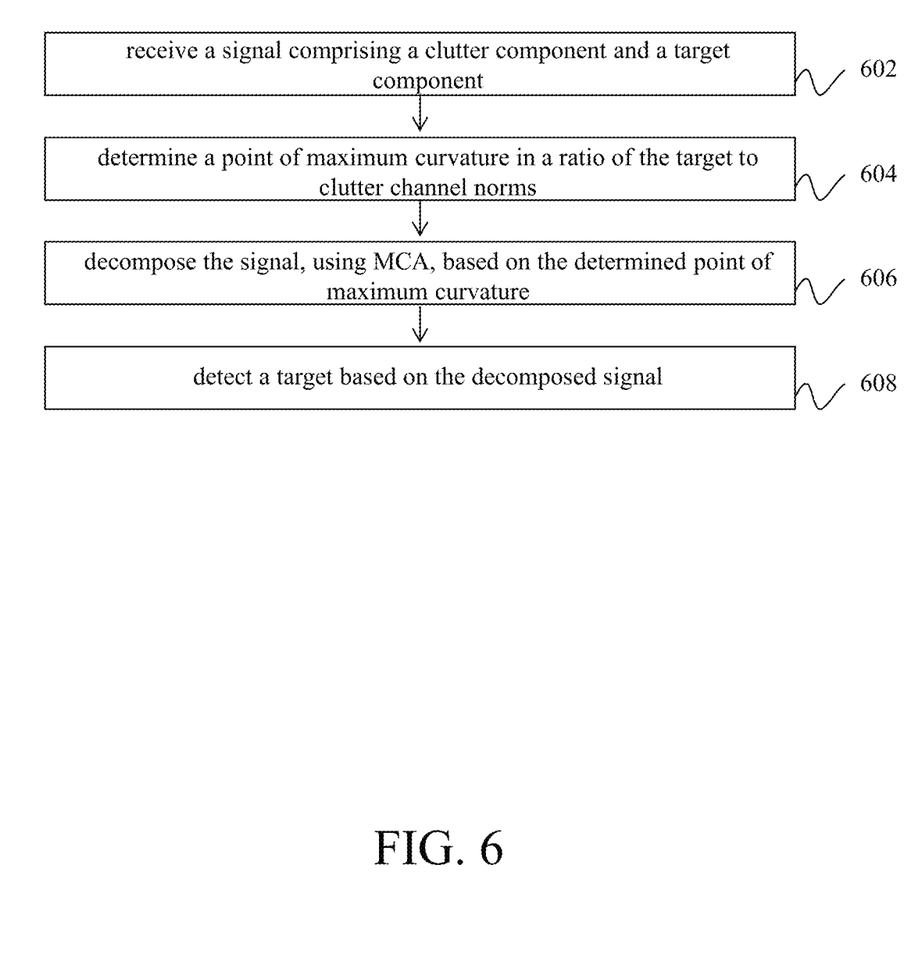
FIG. 6 is a flowchart of an exemplary method for target detection in accordance with an embodiment of the present disclosure.

FIG. 6 is a flowchart of an exemplary method for target detection in accordance with an embodiment of the present disclosure. In step 602, a signal comprising a clutter component and a target component is received. In step 604, a point of maximum curvature in a ratio of the target to clutter channel norms is determined. For example, in an embodiment, the value corresponding to onset of significant clutter "leakage" into the target channel is determined. In an embodiment, $\lambda^*$ can be determined using Equation (5).

In step 606, the signal is decomposed, using MCA, based on the determined point of maximum curvature. For example, MCA is sensitive to the value of the regularization parameter $\lambda$, and the determined value $\lambda^*$ can be used as $\lambda$ in MCA pre-processing. Specifically, in an embodiment, MCA pre-processing can be performed on the received signal according to Equations (1)-(4), using the determined $\lambda^*$ value as $\lambda$. In step 608, a target is detected (e.g., using a target detection algorithm based on the MCA pre-processing performed in step 606). It should be understood that any target detection method can be used in accordance with embodiments of the present disclosure. For example, in an embodiment, MCA pre-processing makes target detection easier by decomposing a received signal into its clutter and target components. After the signal is decomposed, target detection algorithms (e.g., conventional target detection algorithms) can detect a target easier using the decomposed signal. For example, use of MCA pre-processing in accordance with an embodiment of the present disclosure can improve overall detection performance by 10-20 dB.

6. Exemplary System

Figure 7:
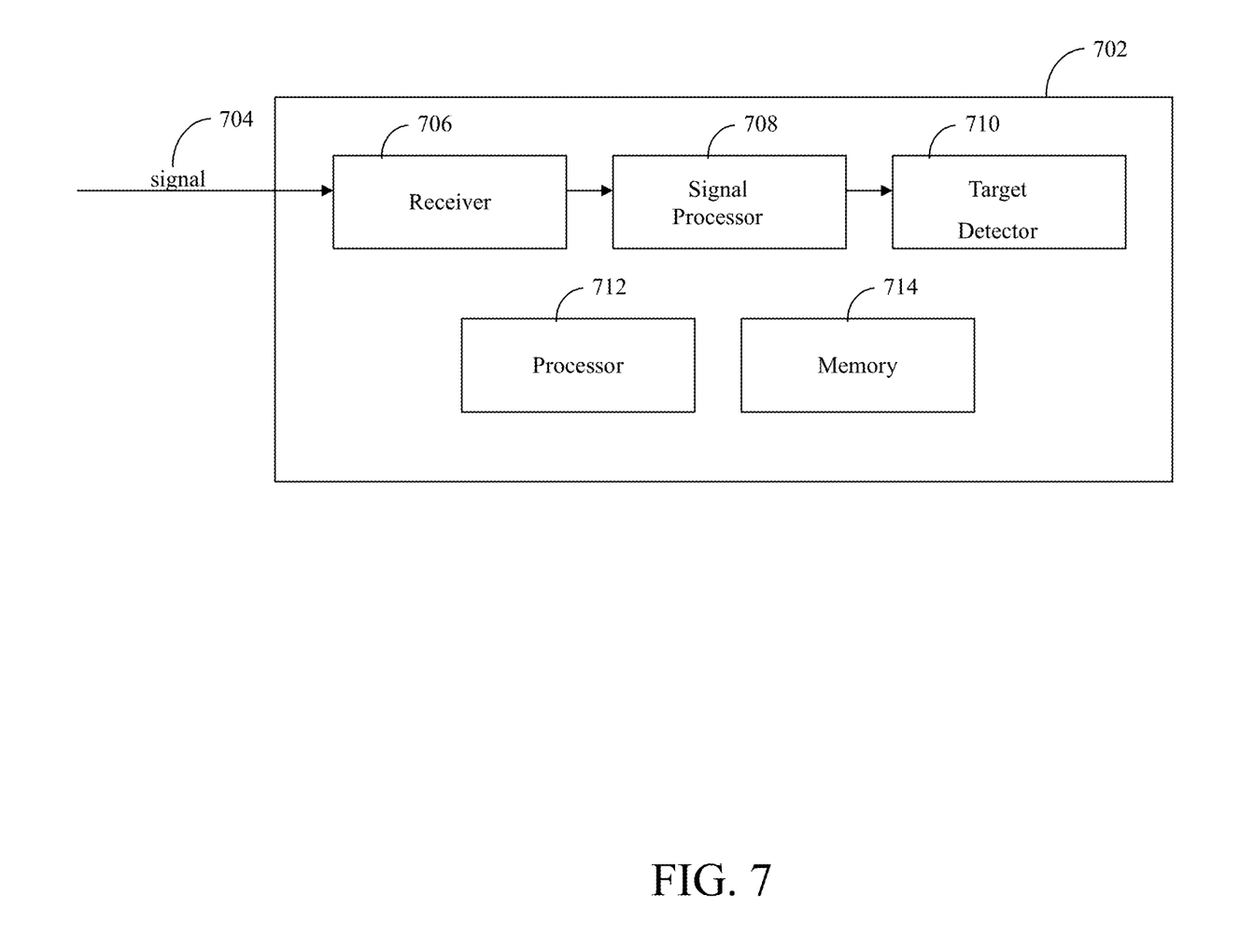
FIG. 7 is a diagram of an exemplary target detection system in accordance with an embodiment of the present disclosure.

FIG. 7 is a diagram of an exemplary target detection system 702 in accordance with an embodiment of the present disclosure. In an embodiment, a receiver 706 of target detection system 702 receives a signal 704. In an embodiment, signal 704 comprises a target component and a clutter component. For example, in an embodiment, receiver 706 is an antenna. However, it should be understood that receiver 706 can be any kind of receiver that is capable of receiving a signal in accordance with an embodiment of the present disclosure.

In an embodiment, receiver 706 sends the signal to signal processor 708. In an embodiment, signal processor 708 is a digital signal processor (DSP). In an embodiment, signal processor 708 is a signal processor device. In an embodiment, signal processor 708 determines $\lambda^*$ and then performs MCA pre-processing based on the determined value $\lambda^*$. For example, in an embodiment, signal processor 708 determines $\lambda^*$ as a point of maximum curvature in a ratio of the target to clutter channel norms in the received signal 704. In an embodiment, signal processor 708 decomposes the signal, using MCA, based on the determined value $\lambda^*$.

In an embodiment, signal processor 708 sends the pre-processed signal to a target detector 710. For example, target detector 710 can be any target detector capable of detecting a target based on a signal comprising a clutter component and a target component. In an embodiment, pre-processing performed by signal processor 708 improves the overall detection performance of target detector 710 by 10-20 dB. In an embodiment, target detector 710 is part of signal processor 708. In an embodiment, target detector 710 is a separate target detector device. For example, in an embodiment, signal processor 708 is configured to perform MCA pre-processing and target detection using MCA pre-processing. In an embodiment target detector 710 (and/or signal processor 708) is configured to send an output signal. For example, in an embodiment, target detector 710 (and/or signal processor 708) is configured to output a result of a signal detection algorithm to a user or to send information regarding a detected signal to another device and/or program.

In an embodiment, target detection system 702 includes a processor 712 and a memory 714. Elements of target detection system 702 can be implemented using hardware, software, and/or a combination of hardware and software in accordance with embodiments of the present disclosure. Elements of target detection system 702 can be implemented using a single device or multiple devices in accordance with embodiments of the present disclosure. Further, elements of target detection system 702 can be implemented as a stand-alone device (e.g., a special purpose target detection device) or implemented into a host device (e.g., a radar system and/or a host computer).

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A target detector, comprising:
   a receiver configured to receive a signal comprising a clutter component and a target component; and
   a signal processor, coupled to the receiver, wherein the signal processor is configured to:
   determine a first L−1 norm determined by a first sum of a first plurality of absolute values of a first plurality of vector elements for the target component, thereby determining a first channel norm for the target component,
   determine a second L−1 norm determined by a second sum of a second plurality of absolute values of a second plurality of vector elements for the clutter component, thereby determining a second channel norm of the clutter component,
   determine a relationship between the first channel norm for the target component and the second channel norm of the clutter component, and
   decompose the signal, using morphological components analysis (MCA), based on the determined relationship.

2. The target detector of claim 1, further comprising:
   a target detector, coupled to the signal processor, wherein the target detector is configured to detect a target based on the decomposed signal.

3. The target detector of claim 1, wherein the signal processor is further configured to detect a target based on the decomposed signal.

4. The target detector of claim 1, wherein the target component is a narrowband component of the signal, and wherein the clutter component is a wideband component of the signal.

5. The target detector of claim 1, wherein signal processor is further configured to determine a value corresponding to an onset of clutter into the target component to determine the point of maximum curvature.

6. The target detector of claim 1, wherein the signal processor is further configured to determine a point of maximum curvature $\lambda$, with respect to a regularization parameter $\lambda$, based on the equation:

$$\lambda^* = \underset{\lambda}{\mathrm{argmax}} \frac{|\beta''|}{(1+\beta'^2)^{\frac{3}{2}}} \text{ with } \beta = \frac{\|x_2\|_1}{\|x_1\|_1},$$

wherein $x_1$ represents the clutter component, wherein $x_2$ represents the target component, and wherein argmax represents values of $x_1$ and $x_2$ that produce the point of maximum curvature.

7. The target detector of claim 6, wherein $x_1$ represents a wideband clutter component, and wherein $x_2$ represents a narrowband component produced by the target.

8. The target detector of claim 7, wherein the signal comprising the clutter component is the sum of $x_1$ and $x_2$.

9. The target detector of claim 6, wherein $x_1$ is sparse under the dictionary $\Phi_1$, and wherein $x_2$ is sparse under the transform $\Phi_2$ such that $x_1 \cong \Phi_1^H w_1$ and $x_2 \cong \Phi_2^H w_2$, wherein $w_1$ and $w_2$ represent sparse coefficients, and wherein H represents a Hermitian conjugate.

10. The target detector of claim 9, wherein a morphological components analysis minimization of a number of atoms needed to represent the signal comprising the clutter component is expressed as $$\underset{w_1, w_2}{\mathrm{argmin}} \lambda \|w_1\|_1 + (1-\lambda)\|w_2\|_1$$

subject to $x = \Phi_1^H w_1 + \Phi_2^H w_2$.

11. A method, comprising:
   receiving, using a processing device, a signal comprising a clutter component and a target component;
   determining a first L−1 norm determined by a first sum of a first plurality of absolute values of a first plurality of vector elements for the target component, thereby determining a first channel norm for the target component;
   determining a second L−1 norm determined by a second sum of a second plurality of absolute values of a second plurality of vector elements for the clutter component, thereby determining a second channel norm of the clutter component;
   determining, using the processing device, a relationship between the first channel norm for the target component and the second channel norm of the clutter component;
   decomposing, using the processing device, the signal, using morphological components analysis (MCA), based on the determined relationship; and
   detecting, using the processing device, a target based on the decomposed signal.

12. The method of claim 11, wherein the target component is a narrowband component of the signal, and wherein the clutter component is a wideband component of the signal.

13. The method of claim 11, wherein determining the point of maximum curvature further comprises determining a value corresponding to an onset of clutter into the target component.

14. The method of claim 11, wherein determining the point of maximum curvature further comprises determining the point of maximum curvature $\lambda$, with respect to a regularization parameter $\lambda$, based on the equation:

$$\lambda^* = \underset{\lambda}{\mathrm{argmax}} \frac{|\beta''|}{(1+\beta'^2)^{\frac{3}{2}}} \text{ with } \beta = \frac{\|x_2\|_1}{\|x_1\|_1},$$

wherein $x_1$ represents the clutter component, wherein $x_2$ represents the target component, and wherein argmax represents values of $x_1$ and $x_2$ that produce the point of maximum curvature.

15. A radar system, comprising:
   an antenna configured to receive a signal comprising a clutter component and a target component; and
   a signal processor device, coupled to the antenna, wherein the signal processor device is configured to:
   determine a first L−1 norm determined by a first sum of a first plurality of absolute values of a first plurality of vector elements for the target component, thereby determining a first channel norm for the target component, and
   determine a second L−1 norm determined by a second sum of a second plurality of absolute values of a second plurality of vector elements for the clutter component, thereby determining a second channel norm of the clutter component,
   determine a relationship between the first channel norm for the target component and the second channel norm of the clutter component, and decompose the signal, using morphological components analysis (MCA), based on the determined relationship.

16. The radar system of claim 15, further comprising:
a target detector, coupled to the signal processor device, wherein the target detector is configured to detect a target based on the decomposed signal.

17. The radar system of claim 15, wherein the signal processor device is further configured to detect a target based on the decomposed signal.

18. The radar system of claim 15, wherein the target component is a narrowband component of the signal, and wherein the clutter component is a wideband component of the signal.

19. The radar system of claim 15, wherein signal processor device is further configured to determine a value corresponding to an onset of clutter into the target component to determine the point of maximum curvature.

20. The radar system of claim 15, wherein the signal processor device is further configured to determine the point of maximum curvature $\lambda$, with respect to a regularization parameter $\lambda$, based on the equation:

$$\lambda^* = \underset{\lambda}{\mathrm{argmax}} \frac{|\beta''|}{(1+\beta'^2)^{\frac{3}{2}}} \text{ with } \beta = \frac{\|x_2\|_1}{\|x_1\|_1},$$

wherein $x_1$ represents the clutter component, wherein $x_2$ represents the target component, and wherein argmax represents values of $x_1$ and $x_2$ that produce the point of maximum curvature.

* * * * *